UNITED STATES PATENT OFFICE.

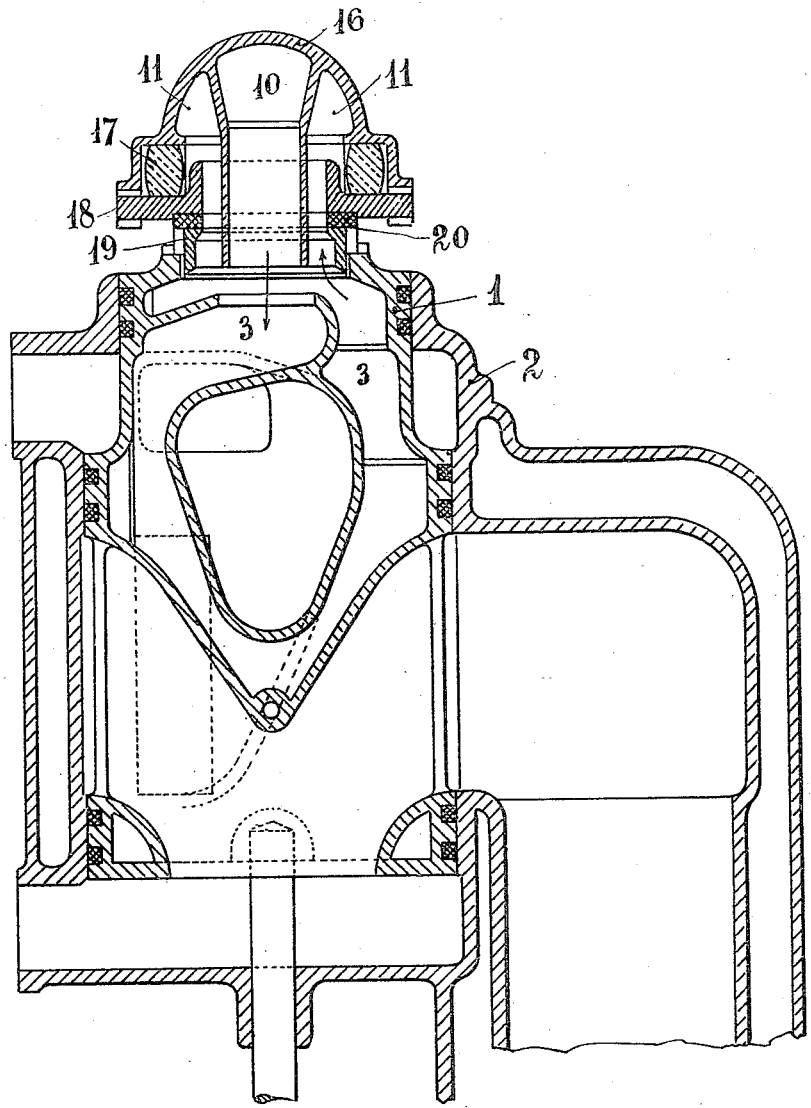

ALBERTO BALLOCO, OF TURIN, ITALY, ASSIGNOR TO ITALA FABBRICA DI AUTOMOBILI, OF TURIN, ITALY.

COMBUSTION-ENGINE.

1,124,193. Specification of Letters Patent. Patented Jan. 5, 1915.

Original application filed September 9, 1911, Serial No. 648,504. Divided and this application filed February 24, 1913. Serial No. 750,307.

*To all whom it may concern:*

Be it known that I, ALBERTO BALLOCO, a subject of the King of Italy, and resident of Turin, Italy, have invented a certain new and useful Improvement in Combustion-Engines, of which the following is a specification.

This invention has for its object a form of packing gland for connecting, in a water tight manner, a rotary member, such as used in combustion engines for effecting the distribution, with the stationary member in which are arranged the inlet and discharge ducts for the water for cooling the rotary member.

The present invention relates to matter described in my co-pending application, Serial No. 648,504, filed Sept. 9, 1911, of which the present application is a division.

In the figure of the accompanying drawing which illustrates the invention 16 is a fixed cap in which are arranged the duct 10 for the admission of the water and duct 11 for its discharge. The rotary member is the distributer 1 mounted in the chamber 2 and provided with channels 3 for the circulation of the cooling water. On the fixed cap 16 is mounted, with a ring 17 of elastic material interposed, a flanged ring 18 arranged opposite to the ring 19 turning with the distributer 1. Between the ring 18 fixed to the cap 16 and ring 19 turning with the distributer is arranged a washer 20, of fiber, leather, wood, antifriction metal or other analogous material. This washer is free to rotate between the two rings 18 and 19 and, being continually pressed on the ring 19 by the resilient ring 17, will distribute over its two faces the friction which without it would occur between the contacting surfaces 18 and 19. There is thus attained a connection which is sufficiently water tight while permitting the rotation of the distributer.

Having described my invention what I claim and desire to secure by Letters Patent of the United States is:—

1. In a packing, the combination of a hollow rotary body having co-axial inlet and outlet openings; a fixed cap having co-axial inlet and outlet conduits substantially registering with said openings respectively; and a washer between said cap and member.

2. In a packing, the combination of a hollow rotary body having co-axial inlet and outlet openings; a fixed cap having co-axial inlet and outlet conduits substantially registering with said openings respectively; and a rotary ring; a washer; a non-rotary ring and an elastic ring interposed between said member and cap.

3. In a packing, the combination of a hollow rotary member having co-axial inlet and outlet openings; a rotary ring mounted on said outlet opening and constrained to rotate with the rotary member; a washer on said ring; a fixed cap having a downwardly projecting flange; a non-rotatable ring resting on said washer; an upturned flange on the inner edge of said non-rotatable ring; and an elastic ring interposed between said flanges and between the cap and rotary ring.

4. In a packing, the combination of a hollow rotary member having co-axial inlet and outlet openings; a ring mounted in said outlet opening and constrained to rotate with the rotary member; a fixed cap having a central inlet duct in alinement with said inlet opening and forming with the cap an annular outlet duct substantially registering with said outlet opening; a washer on said ring; a non-rotatable ring resting on said washer and held against rotation relative to the cap; and an elastic ring interposed between the cap and the non-rotatable ring.

5. In a packing, the combination of a hollow rotary member having co-axial inlet and outlet openings; a rotary ring mounted on said outlet opening and constrained to rotate with the rotary member; a washer on said ring; a fixed cap having a downwardly projecting flange; a non-rotatable ring resting on said washer; an upturned flange on the inner edge of said non-rotatable ring; an elastic ring interposed between said flanges and between the cap and rotary ring; and an inlet tube formed in said cap in alinement with said inlet opening and forming with the cap an annular conduit substantially registering with the outlet opening.

In testimony whereof I have hereunto signed my name in the presence of the two subscribing witnesses.

ALBERTO BALLOCO.

Witnesses:
CARLO TORTA,
JOCELYN GOUBEYRAN.

Copies of this patent may be obtained for five cents each, by addressing the "Commissioner of Patents, Washington, D. C."